United States Patent [19]

Arai

[11] 4,351,010
[45] Sep. 21, 1982

[54] MAGNETIC RECORDING MEDIUM HAVING A VERTICAL AXIS OF EASY MAGNETIZATION

[75] Inventor: Yoshihiro Arai, Asaka, Japan

[73] Assignee: Fuji Photo Film Co., Ltd., Minami-ashigara, Japan

[21] Appl. No.: 130,386

[22] Filed: Mar. 14, 1980

[30] Foreign Application Priority Data

Mar. 16, 1979 [JP] Japan .................. 54-30724

[51] Int. Cl.³ .................. G11B 5/68; G11B 23/00
[52] U.S. Cl. .................. 360/131; 360/134; 360/135
[58] Field of Search .............. 360/131, 135, 134, 136, 360/56; 428/900–910

[56] References Cited

U.S. PATENT DOCUMENTS

| | | | |
|---|---|---|---|
| 2,680,156 | 6/1954 | Thorensen | 360/131 |
| 2,804,506 | 8/1957 | Schurch et al. | 360/111 |
| 4,075,672 | 2/1978 | Manly | 360/131 |

FOREIGN PATENT DOCUMENTS

| | | | |
|---|---|---|---|
| 52-15305 | 2/1977 | Japan | 360/131 |
| 720521 | 3/1980 | U.S.S.R. | 360/131 |

Primary Examiner—Alfred H. Eddleman
Attorney, Agent, or Firm—Fleit & Jacobson

[57] ABSTRACT

A magnetic recording medium comprises a substrate of a non-magnetic material and a magnetic recording layer of a magnetic material provided thereon having an axis of easy magnetization vertical to the magnetic recording layer. The magnetic recording medium has a magnetic flux converging element of high permeability material provided between the substrate and the magnetic recording layer or on the exposed surface of the substrate. The magnetic flux converging element converges a magnetic flux diverging from a magnetic head which is located above the magnetic recording medium.

6 Claims, 6 Drawing Figures

MAGNETIC RECORDING MEDIUM HAVING A VERTICAL AXIS OF EASY MAGNETIZATION

BACKGROUND OF THE INVENTION

1. Field of the Invention

This invention relates to a magnetic recording medium, and more particularly to a magnetic recording medium comprising a substrate of a non-magnetic material and a magnetic recording layer of a magnetic material provided thereon having an axis of easy magnetization vertical to the magnetic recording layer.

2. Description of the Prior Art

In the conventional magnetic recording method wherein a ring-shaped magnetic head is used, mainly utilized is the magnetization in the direction of movement of a recording medium (viz., magnetization of the longitudinal direction of the recording medium). Therefore, as the packing density of the signal to be recorded on the recording medium increases, the strength of the diamagnetic field in the recording medium increases and the residual magnetization is apt to be demagnetized and looped. As the result of the demagnetization and loop of the residual magnetization, it becomes difficult or impossible to reproduce the signal.

In order to make it possible to magnetically record information at a high density, there has been proposed a magnetic recording method using a magnetic recording medium comprising a substrate of a non-magnetic material and a magnetic recording layer of a magnetic material provided thereon having an axis of easy magnetization vertical to the magnetic recording layer. In the above-mentioned type magnetic recording method (hereinbelow referred to as "vertical magnetic recording method"), there is used a magnetic head comprising a rodshaped iron core and a coil wound up therearound. The magnetic head is located above the magnetic recording medium such that the iron core stands vertical to the medium with one end thereof close to the magnetic recording layer of the medium. Magnetic recording of information on the medium is performed by magnetizing the magnetic recording layer with a magnetic flux which is emanated from the iron core excited by the coil and flows vertical to the magnetic recording layer of the medium.

In the vertical magnetic recording method, magnetic recording is performed by utilizing a residual magnetization vertical to the magnetic recording layer of the medium. Therefore, as the packing density increases, the strength of the diamagnetic field in the medium decreases, and accordingly the strength of the residual magnetization increases. Thus, by employing the vertical magnetic recording method, the magnetic recording can be performed at a high density.

In the vertical magnetic recording method, the magnetic flux emanated from the iron core diverges and flows toward the medium. Further, when passing through the magnetic recording layer, the magnetic flux further diverges along the layer and the cross-sectional area of the magnetic flux becomes larger than that of the iron core. Therefore, the magnetized area of the magnetic recording layer becomes larger than the cross-sectional area of the iron core.

In order to solve the above-mentioned defect of the vertical magnetic recording method, Japanese Patent Laid Open No. 32,009/1978 proposes the provision of a magnetic pole of high permeability material on the opposite side of the medium to the magnetic head, thereby converging the magnetic flux from the iron core of the magnetic head.

Since the magnetic flux from the iron core is converged by the magnetic pole, the method disclosed in the Japanese Patent Laid Open No. 32,009/1978 has the advantage that magnetic recording can be performed at a high density. However, the method has the defect that the method is only applicable to the magnetic recording apparatus employing a magnetic recording tape, because the magnetic pole and the magnetic head should be located on the opposite sides of the medium. Further, the method has the defect that the magnetic recording apparatus should have a large size.

SUMMARY OF THE INVENTION

In view of the above-mentioned observations of the prior art, the primary object of the present invention is to provide a magnetic recording medium for a vertical magnetic recording method which itself is capable of converging a magnetic flux from a magnetic head located above and vertically to the medium.

The magnetic recording medium of the present invention comprises a substrate of a non-magnetic material and a magnetic recording layer of a magnetic material provided thereon having an axis of easy magnetization vertical to the magnetic recording layer characterized in that a magnetic flux converging element of high permeability material is further provided between the substrate and the magnetic recording layer or on the exposed surface of the substrate.

In the magnetic recording medium of the present invention, a magnetic flux from an iron core of a magnetic head is converged by the magnetic flux converging element and therefore, magnetic recording on the medium is performed by the converged magnetic flux without using any additional magnetic pole or the like.

DESCRIPTION OF THE PREFERRED EMBODIMENTS

Figure 1:
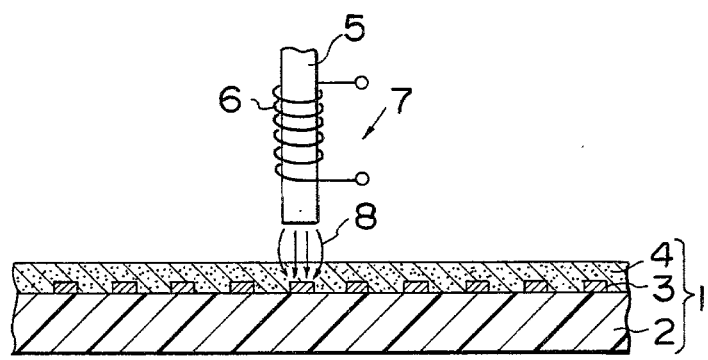
FIG. 1 is a longitudinal cross-sectional view of a magnetic recording medium in accordance with the first embodiment of the present invention.

Referring to the drawings, the preferred embodiments of the present invention will hereinbelow be described in detail.

FIG. 1 is a longitudinal cross-sectional view of a magnetic recording medium in accordance with the first embodiment of the present invention. The magnetic recording medium 1 has a substrate 2 comprising a non-magnetic material such as plastics, glass, aluminum or copper. On the surface of the substrate 2, there are disposed a plurality of dot like isolated magnetic flux converging elements 3 of high permeability material such as permalloy. All the dot like isolated magnetic flux converging elements 3 have the same shape such as circle, rectangle or square. The isolated magnetic flux converging elements 3 are formed by providing on the substrate 2 a layer of a material having high permeability such as permalloy having a thickness of not less than $1\mu$ by vacuum deposition or sputtering, and then photo-etching the layer. Alternatively, the isolated magnetic flux converging elements 3 are formed by vacuum deposition or sputtering employing a master pattern. The isolated magnetic flux converging elements 3 are most preferably arranged in a row at regular intervals along the recording track of the medium 1. Even if the isolated magnetic flux converging elements 3 are arranged in a row at irregular intervals or are arranged in staggered fashion, they are still able to converge the magnetic flux. On the substrate 2 on which the isolated magnetic flux converging elements 3 are disposed as mentioned above, a magnetic recording layer 4 is formed by a method such as vacuum deposition or sputtering. The magnetic recording layer 4 is provided on the substrate 2 so that the magnetic recording layer 4 has an axis of easy magnetization vertical thereto. The magnetic recording layer 4 commonly has generally a thickness ranging from 0.1 to $3\mu$.

When the thickness of the isolated magnetic flux converging elements 3 is large, the surface of the magnetic recording layer 4 is apt to be roughened. In such a case, a layer of a non-magnetic metal such as copper is desirably provided on the surface of the substrate 2 at the portions where there is no isolated magnetic flux converging elements 3. For example, the layer is formed by the following process. That is, before the removal of the resist on the isolated magnetic flux converging elements 3 (which is the last step of the formation of the isolated magnetic flux converging elements 3), a non-magnetic metal layer having the same thickness as the isolated magnetic flux converging elements 3 is provided on the surface of the substrate 2 by a method such as vacuum deposition or sputtering, and then the resist is removed.

As the high permeability material employed in the magnetic flux converging elements 3, other than the abovementioned permalloy, one can use Supermalloy, Sendust, Alperm, soft-ferrite, and the like. Further, a quenched amorphous magnetic material having a composition such as Fe-Co-C-B can also be used. As will described hereinafter, the recording of information on the above-described magnetic recording medium 1 and the reproduction of the recorded information therefrom are performed by employing a magnetic head 7 comprising a rod-shaped iron core 5 and a coil 6 wound up therearound disposed above the magnetic recording medium 1 as shown in FIG. 1. As the iron core 5 of the magnetic head 7, a known iron core such as soft-iron, silicon steel, and the like can be used.

When the iron core 5 is excited by a signal current flowing in the coil 6, a magnetic flux 8 directed to the medium 1 is emanated from the end of the iron core 5. The magnetic flux 8 usually diverges from the end of the iron core 5. However, in the present invention, the magnetic flux 8 is converged by the magnetic flux converging element 3 of high permeability material as shown in FIG. 1, and the magnetic recording layer 4 is magnetized by the converged magnetic flux 8. The recording of information on the medium 1 is performed by moving the medium 1 and progressively magnetizing the magnetic recording layer 4 with the magnetic flux 8 converged by the magnetic flux converging element 3. The medium 1 is particularly suitable for a digital recording wherein a signal current is caused to flow though the coil 6 when the magnetic head 7 comes above one magnetic flux converging element 3, and the signal current is cut off when the magnetic head 7 passes the element 3 so that only the limited portions of the magnetic recording layer 4 above the magnetic flux converging elements 3 are magnetized. Of course, the medium 1 may be used for an analog recording wherein a signal current is caused to flow through the coil 6 continuously.

On the other hand, the reproduction of the recorded information from the medium 1 is performed by detecting the magnetic flux from the magnetic recording layer 4 by means of the magnetic head 7.

Figure 2:
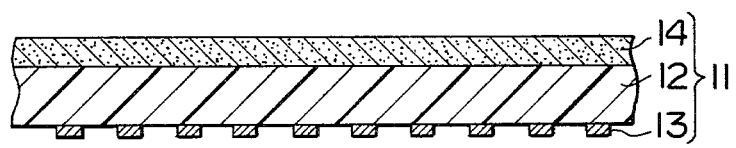
FIG. 2 is a longitudinal cross-sectional view of a magnetic recording medium in accordance with the second embodiment of the present invention.

Referring to FIG. 2, a magnetic recording medium 11 in accordance with the second embodiment of the present invention will be described.

The medium 11 is composed of a substrate 12, a magnetic recording layer 14 provided on one surface of the substrate 12 and a plurality of isolated magnetic flux converging elements 13 of high permeability material provided on the other surface of the substrate 12. The isolated magnetic flux converging elements 13 are arranged in a row and have the same function as that of the isolated magnetic flux converging elements 3 shown in FIG. 1. The medium 11 has the advantage that the isolated magnetic flux converging elements 13 prevent the triboelectrification on the substrate 12 at the exposed surface thereof.

Figure 3:
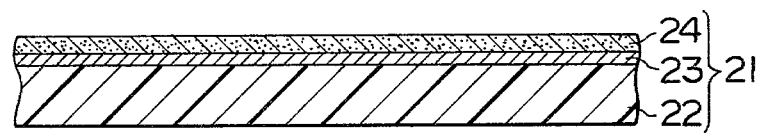
FIG. 3 is a longitudinal cross-sectional view of a magnetic recording medium in accordance with the third embodiment of the present invention.

Referring next to FIG. 3, a magnetic recording medium 21 in accordance with the third embodiment of the present invention will be described.

Figure 4:
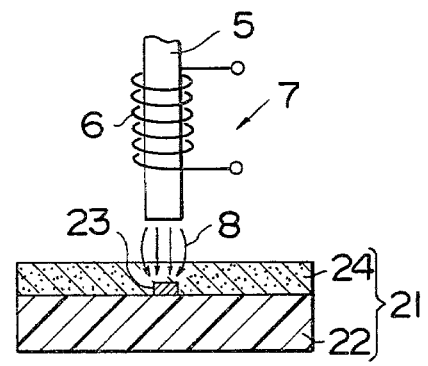
FIG. 4 is a lateral cross-sectional view of the magnetic recording medium shown in FIG. 3.

The medium 21 is composed of a substrate 22, a magnetic recording layer 24 provided on the substrate 22 and a linear magnetic flux converging element 23 high permeability material provided between the substrate 22 and the magnetic recording layer 24. The linear magnetic flux converging element 23 is disposed along the recording track of the magnetic recording layer 24. When information is recorded on the medium 21, the magnetic flux 8 emanating from the iron core 5 is not converged in the longitudinal direction of the medium 1 but converged in the lateral direction thereof as shown in FIG. 4. Therefore, the medium 21 exhibits high tracking performance at the time of recording. Alternatively, the linear magnetic flux converging element 23 may be provided on the exposed surface of the substrate 21 as the embodiment shown in FIG. 2.

Further, referring to FIG. 5, a magnetic recording medium 31 in accordance with the fourth embodiment of the present invention will be described.

The medium 31 is composed of a substrate 32, a first magnetic recording layer 34 provided on one surface of the substrate 32, isolated magnetic flux converging elements 33 of high permeability material provided therebetween, and a second magnetic recording layer 34' provided on the other surface of the substrate 32. In the medium 31, different information can be recorded independently on the magnetic recording layers 34 and 34'.

Figure 6:
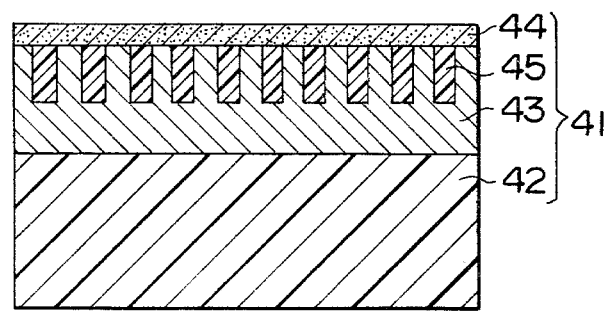
FIG. 6 is a longitudinal cross-sectional view of a magnetic recording medium in accordance with the fifth embodiment of the present invention.

Furthermore, referring to FIG. 6, a magnetic recording medium 41 in accordance with the fifth embodiment of the present invention will be described.

In the medium 41, a magnetic flux converging element 43 of high permeability material may be provided on a substrate 42, or the magnetic flux converging element 43 may also serve as the substrate 42. The magnetic flux converging element 43 has cavities filled with a non-magnetic material 45 as shown in FIG. 6. A magnetic recording layer 44 is provided on the top surface of the magnetic flux converging element 43.

Figure 5:
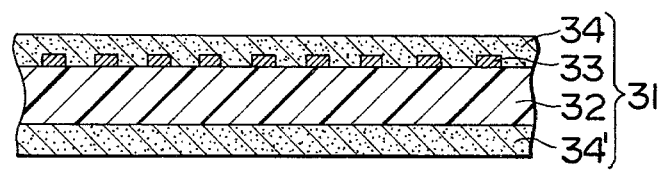
FIG. 5 is a longitudinal cross-sectional view of a magnetic recording medium in accordance with the fourth embodiment of the present invention.

It is desirable that the isolated magnetic flux converging elements 3, 13 and 33 respectively shown in FIG. 1, 2 and 5 and the linear magnetic flux converging elements 23 shown in FIG. 3 have a width corresponding to that of the recording track.

When the magnetic recording medium of the present invention is used in a vertical magnetic recording method, a diverging magnetic flux from a magnetic head is converged by the magnetic flux converging element of the medium. Therefore, by using the magnetic recording medium of the present invention, information can be recorded at a high packing density. In addition to this, in the magnetic recording medium of the present invention, accurate tracking can be performed. Further, when the magnetic recording medium of the present invention is used, it is possible to narrow the width of the recording track and accordingly, a multiple track of high density can be designed.

When the magnetic flux converging element is provided between the substrate and the magnetic recording layer, the medium may be made into any form. That is, the medium in accordance with the present invention may not only be made in the form of a magnetic recording tape but also may be made into a magnetic recording disk or a magnetic recording drum.

I claim:

1. In a magnetic recording medium for use in vertical magnetic recording, comprising a substrate of a non-magnetic material, and a magnetic recording layer of a magnetic material provided thereon having an axis of easy magnetization vertical with respect to said magnetic recording layer, wherein the improvement comprises a magnetic flux converging element of linear shape and having a high permeability material provided between said substrate and said magnetic recording layer, said magnetic flux converging element converging a diverging magnetic flux from a magnetic head located above said magnetic recording medium, and further comprising a non-magnetic material provided in said magnetic flux converging element.

2. A magnetic recording medium for use in vertical magnetic recording, comprising a substrate of a non-magnetic material having an exposed surface and an unexposed surface, a magnetic recording layer of a magnetic material provided on the unexposed surface of said substrate and having an axis of easy magnetization vertical with respect to said magnetic recording layer, and a magnetic flux converging element of a high permeability material provided directly on the exposed surface of said substrate of said magnetic recording medium, said magnetic flux converging element converging a diverging magnetic flux from a magnetic head located above said magnetic recording medium.

3. A magnetic recording medium as defined in claim 2 wherein said magnetic flux converging element a plurality of uniformly isolated units which are arranged in at least one row.

4. A magnetic recording medium as defined in claim 3 wherein said units are arranged at regular intervals.

5. A magnetic recording medium as defined in claim 2 wherein said magnetic flux converging element has a linear shape.

6. In the magnetic recording medium as defined in claim 1, wherein said magnetic flux converging element is discontinuous so as to have cavities formed therein, said non-magnetic material being disposed in said cavities.

* * * * *